United States Patent
Park et al.

(10) Patent No.: US 7,631,146 B2
(45) Date of Patent: Dec. 8, 2009

(54) PROCESSOR WITH CACHE WAY PREDICTION AND METHOD THEREOF

(75) Inventors: Gi-ho Park, Seoul (KR); Hoi-jin Lee, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 131 days.

(21) Appl. No.: 11/264,158

(22) Filed: Nov. 2, 2005

(65) Prior Publication Data
US 2006/0095680 A1    May 4, 2006

(30) Foreign Application Priority Data
Nov. 2, 2004    (KR) ............... 10-2004-0088217

(51) Int. Cl.
*G06F 12/00* (2006.01)
(52) U.S. Cl. .................. 711/128; 711/125
(58) Field of Classification Search ........... 711/125, 711/128
See application file for complete search history.

(56) References Cited

U.S. PATENT DOCUMENTS

| | | | |
|---|---|---|---|
| 5,887,152 A * | 3/1999 | Tran | 712/217 |
| 5,956,746 A | 9/1999 | Wang | |
| 6,101,595 A * | 8/2000 | Pickett et al. | 712/205 |
| 6,222,241 B1 | 4/2001 | Plat | |
| 6,279,107 B1 * | 8/2001 | Tran | 712/239 |
| 6,425,055 B1 * | 7/2002 | Sager et al. | 711/118 |
| 6,687,789 B1 | 2/2004 | Keller et al. | |
| 6,976,126 B2 * | 12/2005 | Clegg et al. | 711/128 |
| 2004/0030838 A1 * | 2/2004 | van de Waerdt | 711/137 |
| 2004/0168043 A1 * | 8/2004 | Keller et al. | 712/207 |

OTHER PUBLICATIONS

Hennessy, J.L., and D.A. Patterson [2003]. Computer Architecture, a Quantitative Approach, third ed., Morgan Kaufman, pp. 199, 210, 399.*

Notice to Submit Response issued for Application No. KR 10-2004-0088217 dated May 25, 2006 and English translation thereof.

* cited by examiner

*Primary Examiner*—Matt Kim
*Assistant Examiner*—John P Fishburn
(74) *Attorney, Agent, or Firm*—Harness, Dickey & Pierce, P.L.C.

(57) ABSTRACT

A processor with cache way prediction and method thereof. The processor includes a cache way prediction unit for predicting at least one cache way for selection from a plurality of cache ways. The processor may further include an instruction cache for accessing the selected at least one cache way, where the selected at least one cache way is less than all of the plurality of cache ways. The method includes predicting less than all of a plurality of cache ways for selection and accessing the selected less than all of the plurality of cache ways. In both the process and method thereof, by accessing less than all of the plurality of cache ways, a power consumption and delay may be reduced.

41 Claims, 4 Drawing Sheets

PROCESSOR WITH CACHE WAY PREDICTION AND METHOD THEREOF

PRIORITY STATEMENT

This application claims the benefit of Korean Patent Application No. 10-2004-0088217, filed on Nov. 2, 2004, in the Korean Intellectual Property Office, the disclosure of which is incorporated herein in its entirety by reference.

BACKGROUND OF THE INVENTION

1. Field of the Invention

The present invention relates to a processor and method thereof and more particularly, to a processor with cache way prediction and method thereof.

2. Description of the Related Art

Lower power consumption may be a desirable characteristic in electronic devices (e.g., portable electronic devices). Electronic devices (e.g., portable electronic devices) may include embedded processors. Power consumption and an operating speed of an embedded processor in an electronic device may be factors in determining the performance of the electronic device.

FIG. 1 illustrates a conventional processor 100 capable of performing branch prediction. Referring to FIG. 1, the processor 100 may include a fetch unit 110, an instruction cache 120, an instruction decoder 130, an execution unit 140 and a branch prediction unit 150.

For each clock cycle of the processor 100, the fetch unit 110 may fetch a fetch address FADR from a memory (not shown) in response to a program counter (PC) signal. The fetch unit 110 may determine an address to be fetched from the memory for a subsequent clock cycle (e.g., a next clock cycle). The branch prediction unit 150 may determine whether an instruction associated with the fetch address FADR is a branch instruction. If the branch prediction unit 150 determines the fetch address FADR a branch instruction, the branch prediction unit 150 may further determine whether the branch instruction is predicted to branch. If the fetch address FADR a branch instruction predicted for branching, the branch prediction unit 150 may output a branch target address TADR. The fetch unit 110 may select an address to be fetched from the memory (not shown) from among the branch target address TADR and a plurality of candidate addresses in a subsequent clock cycle (e.g., a next clock cycle) and may transmit the selected address to the instruction cache 120.

The instruction cache 120 may access data (e.g., tags, instructions, etc.) stored in the selected address received from the fetch unit 110 and may output the stored data (e.g., from a data block which matches the selected address received from the fetch unit 110). The data output from the instruction cache 120 may be received by the instruction decoder 130 as a fetch instruction. The instruction decoder 130 may decode the fetch instruction and may determine an instruction type (e.g., a branch instruction) specified by the fetch instruction. The execution unit 140 may execute the fetch instruction.

If the instruction cache 120 is a set associative cache, the instruction cache 120 may include a plurality of cache ways, where each of the plurality of cache ways includes a tag memory and a data memory. The instruction cache 120 may perform a tag matching operation by accessing each of the plurality of cache ways in response to the selected address (e.g., received from the fetch unit 110) and may output data stored in a block which matches the tag associated with the selected address. For example, if the instruction cache 120 is a four-way set associative cache, the instruction cache 120 may select data in four addresses by accessing four cache ways to determine a tag match and may then re-select the address including the matching tag. Each of the four cache ways may include a tag memory and a data memory. In the above-described example conventional method, the instruction cache 120 may consume a higher amount of power when accessing the cache ways of the instruction cache 120 (e.g., because each of the cache ways may be accessed).

SUMMARY OF THE INVENTION

An example embodiment of the present invention is directed to a processor, including a cache way prediction unit for predicting at least one cache way for selection from among a plurality of cache ways without accessing an instruction cache.

Another example embodiment of the present invention is directed to a method of processing, including predicting at least one cache way for selection from among a plurality of cache ways without accessing an instruction cache.

Another example embodiment of the present invention is directed to a method of processing, including predicting at least one cache way to access in an instruction cache based on a comparison of an address of a predicted instruction and less than all of a cache way tag.

BRIEF DESCRIPTION OF THE DRAWINGS

The accompanying drawings are included to provide a further understanding of example embodiments of the invention, and are incorporated in and constitute a part of this specification. The drawings illustrate example embodiments of the present invention and, together with the description, serve to explain principles of the present invention. In the drawings.

DETAILED DESCRIPTION OF EXAMPLE EMBODIMENTS OF THE PRESENT INVENTION

Figure 1:
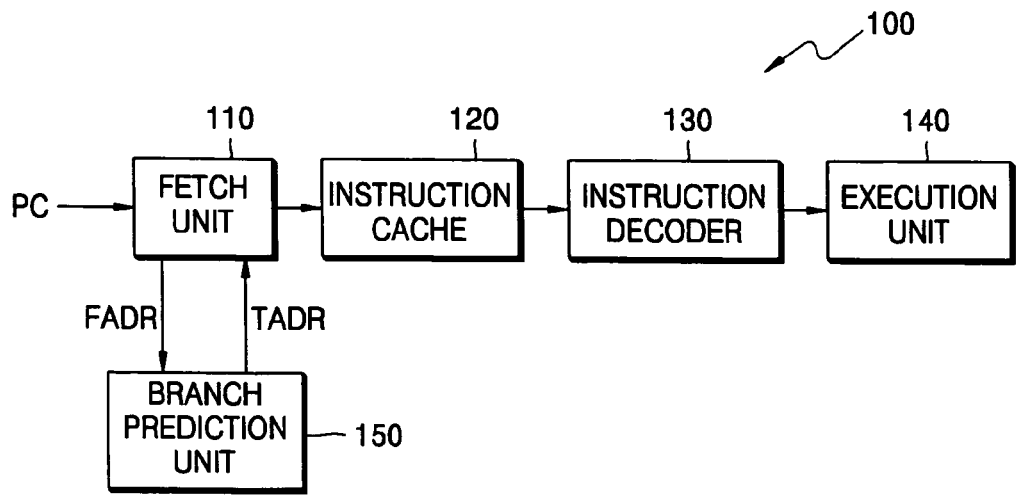
FIG. 1 illustrates a conventional processor capable of performing branch prediction.

Hereinafter, example embodiments of the present invention will be described in detail with reference to the accompanying drawings.

In the Figures, the same reference numerals are used to denote the same elements throughout the drawings.

Figure 2:
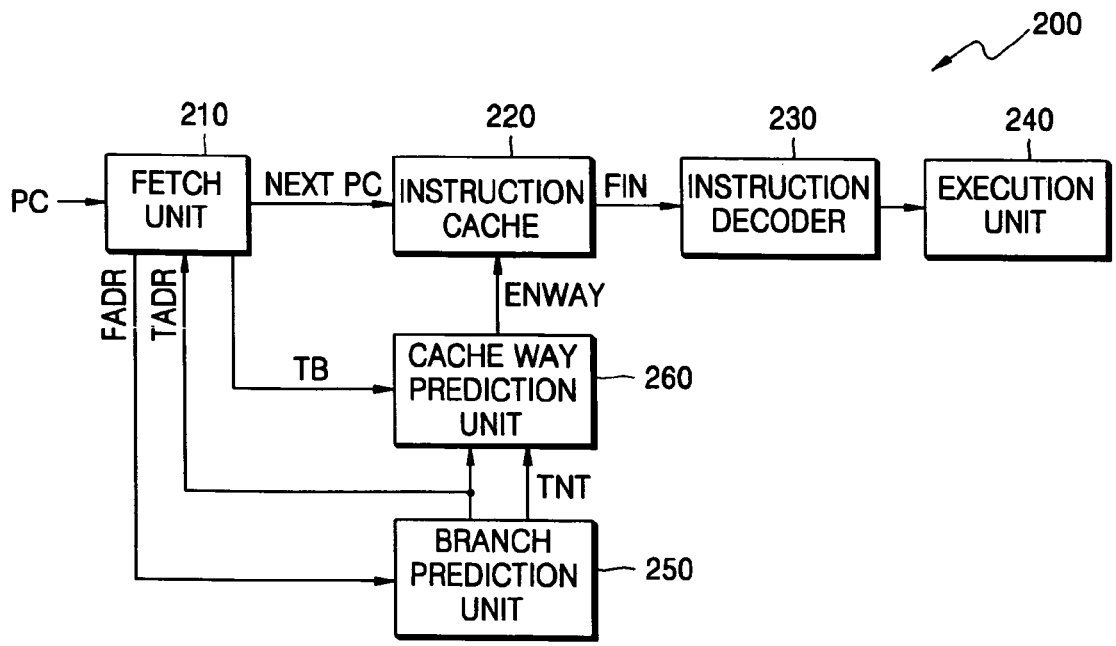
FIG. 2 illustrates a processor according to an example embodiment of the present invention.

FIG. 2 illustrates a processor 200 according to an example embodiment of the present invention. In the example embodiment of FIG. 2, the processor 200 may include a fetch unit 210, an instruction cache 220, an instruction decoder 230, an execution unit 240, a branch prediction unit 250 and a cache way prediction unit 260.

In the example embodiment of FIG. 2, at each clock cycle of the processor 200, the fetch unit 210 may fetch a fetch address FADR from a memory (not shown) in response to a program counter (PC) signal and may determine an address NEXT PC to be fetched in a subsequent clock cycle (e.g., a next clock cycle).

In the example embodiment of FIG. 2, the branch prediction unit 250 may determine whether an instruction associated with the fetch address FADR is a branch instruction. If the branch prediction unit 250 determines the fetch address FADR is associated with the branch instruction, the branch prediction unit 250 may further determine whether the branch instruction is predicted to branch. If the fetch address FADR is associated with a branch instruction predicted for branching, the branch prediction unit 250 may output a branch target address TADR and a determination signal TNT. Examples of the structure and operation of the branch prediction unit 250 will be described in further detail later with reference to FIG. 3.

In the example embodiment of FIG. 2, if the branch prediction unit 250 determines that the fetch address FADR is associated with a branch instruction for which a branch is predicted, the cache way prediction unit 260 may determine a given cache way in the instruction cache 220 having an increased probability of resulting in a cache hit (e.g., as compared to other cache ways in the instruction cache 220) for the branch target address TADR. The cache way prediction unit 260 may compare a portion of the branch target address TADR with a corresponding portion (e.g., a sub-tag) in each of a plurality of cache ways (e.g., in the instruction cache 220). The cache way prediction unit 260 may select the given cache way (e.g., a cache way determined to be most likely to result a cache hit) based at least in part on the determination signal TNT and a signal TB. The signal TB may indicate whether the fetch address NEXT PC may be the branch target address TADR. The cache way prediction unit 260 may output a cache way enable signal ENWAY. The branch prediction unit 250 and the instruction cache 220 will be described in further detail later with reference to FIGS. 4 and 5. In an example, the instruction cache 220 may be a set associative cache. In another example, the instruction cache 220 may be any well-known cache structure.

In the example embodiment of FIG. 2, the fetch unit 210 may select one of the branch target address TADR, a sequential address fetched in response to the PC signal (e.g., an incremented PC signal) and/or other candidate addresses as the fetch address NEXT PC based on results provided by the branch prediction unit 250 and/or other conditions. The fetch unit 210 may transmit the selected address to the instruction cache 220. The fetch unit 210 may also transmit the signal TB (e.g., indicating whether the fetch address NEXT PC is the branch target address) to the cache way prediction unit 260.

In another example embodiment of the present invention, referring to FIG. 2, the fetch unit 210 may generate the signal TB at a first logic level (e.g., a higher logic level, a lower logic level, etc.) to indicate whether the fetch address NEXT PC is the branch target address. The fetch unit 210 may determine whether the fetch address NEXT PC is the branch target address in any well-known manner (e.g., if the fetch address NEXT PC is less than the PC signal, if the fetch address NEXT PC includes a value other than an incremented PC signal, etc.). The instruction cache 220 may access a plurality of cache ways (e.g., in the instruction cache 220) in response to the fetch address NEXT PC received from the fetch unit 210. The instruction cache 220 may output cache-hit data as a fetch instruction FIN. In another example, if the fetch unit 210 selected the branch target address TADR as the fetch address NEXT PC, the instruction cache 220 may access a given one of the plurality of cache ways (e.g., in the instruction cache 220), the given one cache way selected by the cache way prediction unit 260 in accordance with the branch target address TADR. The instruction cache 220 may output data from a cache way with a tag matching a tag of the branch target address TADR (e.g., a block where a cache hit has occurred) as the fetch instruction FIN.

In the example embodiment of FIG. 2, the fetch instruction FIN may be received by the instruction decoder 230. The instruction decoder 230 may decode the fetch instruction FIN and determine a type of operation specified by the fetch instruction FIN (e.g., a branch instruction). The execution unit 240 may execute the fetch instruction FIN.

Figure 3:
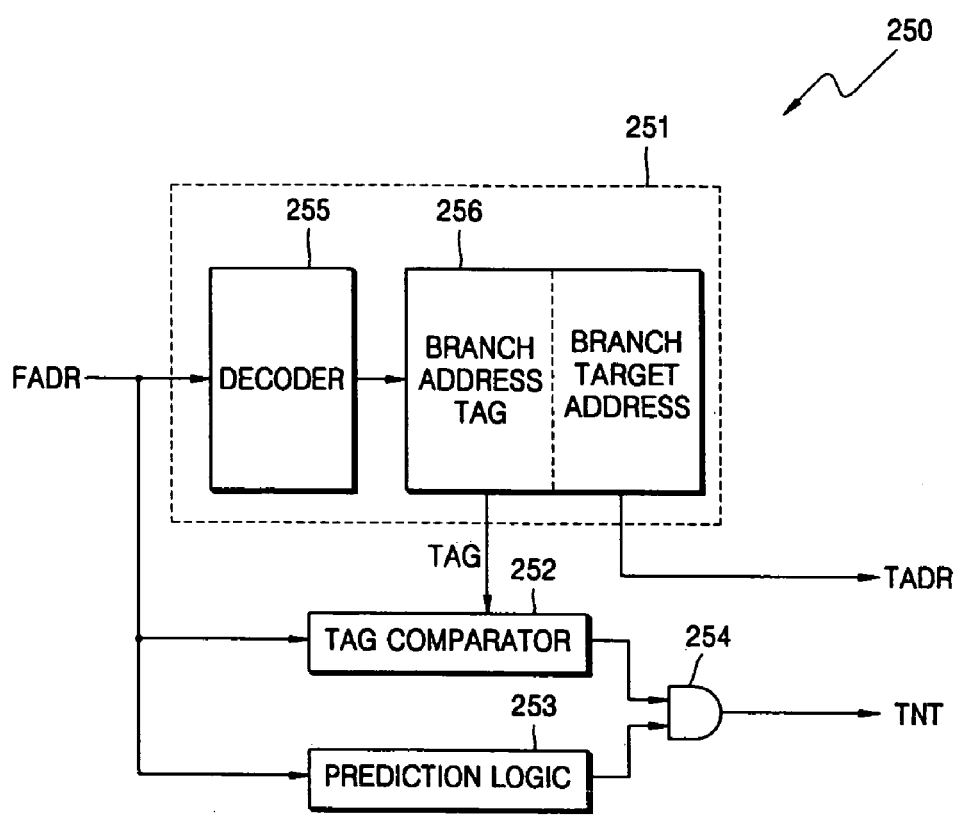
FIG. 3 illustrates a branch prediction unit of FIG. 2 according to another example embodiment of the present invention.

FIG. 3 illustrates the branch prediction unit 250 of FIG. 2 according to another example embodiment of the present invention. In the example embodiment of FIG. 3, the branch prediction unit 250 may include a branch target buffer 251, a tag comparator 252, prediction logic 253 and a determiner 254.

In the example embodiment of FIG. 3, the branch target buffer 251 may output a branch address tag TAG and the branch target address TADR in response to the fetch address FADR. The branch target buffer 251 may include a decoder 255 and a memory 256. The decoder 255 may generate a first selection signal referencing an index field of the fetch address FADR. The fetch address FADR may include a tag field, the index field (e.g., referenced by the first selection signal) and an offset field. The decoder 255 may generate a second selection signal referencing the branch address tag TAG (e.g., stored in the memory 256) and the branch target address TADR (e.g., stored in the memory 256), the branch address tag TAG and the branch target address TADR associated with the index field of the fetch address FADR. The memory 256 may store a plurality of branch address tags and their respective branch target addresses and may output a given branch address tag TAG and a corresponding given branch target address TADR in response to the selection signal generated by the decoder 255.

In the example embodiment of FIG. 3, the tag comparator 252 may compare the branch address tag TAG received from the memory 256 with the branch address tag TAG included in the fetch address FADR and may generate a comparison signal indicating whether the branch address tag TAG is identical to the branch address tag TAG included in the fetch address FADR based on the comparison. For example, the comparison signal generated by the tag comparator 252 may be at the first logic level (e.g., a higher logic level, a lower logic level, etc) to indicate the branch address tag TAG is identical to the branch address tag TAG in the fetch address FADR. In an alternative example, the comparison signal generated by the tag comparator 252 may be at a second logic level (e.g., a higher logic level, a lower logic level, etc.) to indicate the branch address tag TAG is not identical to the branch address tag TAG in the fetch address FADR.

In the example embodiment of FIG. 3, the prediction logic 253 may generate a prediction signal indicating whether the fetch address FADR corresponds to a branch instruction for which a branch is predicted based on any well-known branch prediction algorithm (e.g., prediction logic 253). For example, the prediction signal generated by the prediction logic 253 may be at the first logic level (e.g., a higher logic level, a lower logic level, etc.) to indicate that the fetch address FADR corresponds to a branch instruction for which a branch is predicted. In an alternative example, the prediction signal generated by the prediction logic 253 may be at the second logic level (e.g., a higher logic level, a lower logic level, etc.) to indicate that the fetch address FADR corresponds to a branch instruction for which a branch is not predicted. The prediction logic 253 may employ any well-known branch prediction method.

In the example embodiment of FIG. 3, the determiner 254 may compare the comparison signal (e.g., from the tag comparator 252) with the prediction signal (e.g., from the prediction logic 253) and may generate the determination signal TNT. The determination signal TNT may indicate whether the branch instruction (e.g., corresponding to the fetch address FADR) is predicted to branch based on the comparison of the determiner 254. For example, the determination signal TNT may be generated by the determiner 254 at the first logic level to indicate the branch instruction is predicted to branch (e.g., if the comparison signal and the prediction signal are equal). In an alternative example, the determination signal TNT may be generated by the determiner 254 at the second logic level to indicate the branch instruction is not predicted to branch (e.g., if the comparison signal and the prediction signal are not equal).

Figure 4:
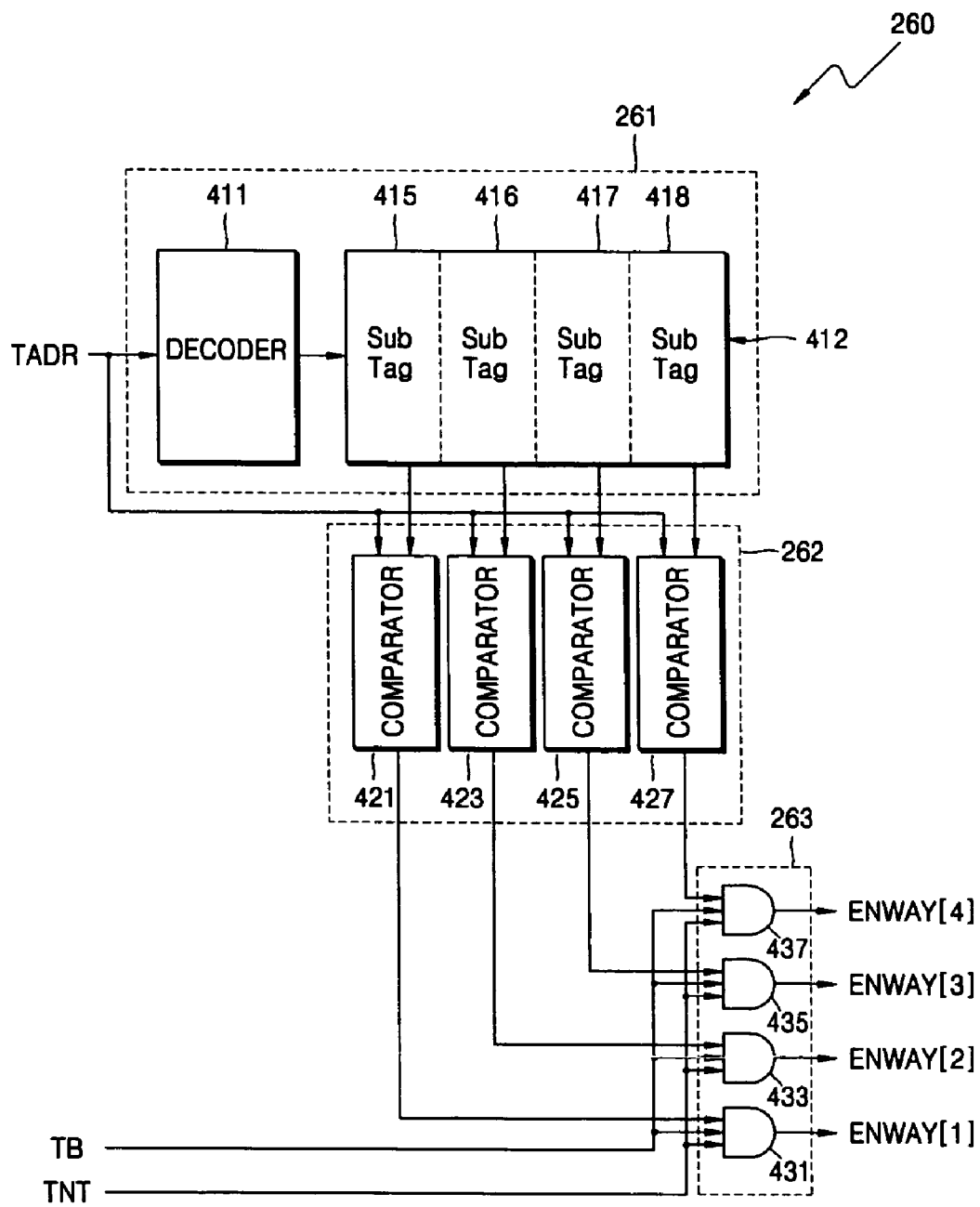
FIG. 4 illustrates a cache way prediction unit of FIG. 2 according to another example embodiment of the present invention.

FIG. 4 illustrates the cache way prediction unit 260 of FIG. 2 according to another example embodiment of the present invention. In the example embodiment of FIG. 4, the cache way prediction unit 260 may include a subtag buffer 261, a comparator 262 and a determiner 263.

In the example embodiment of FIG. 4, the subtag buffer 261 may output subtags of a plurality of cache ways (e.g., included in the instruction cache 220) in response to the branch target address TADR received from the branch prediction unit 250. The subtag buffer 261 may include a decoder 411 and a subtag memory 412. The decoder 411 may generate a selection signal referencing an index field of the branch target address TADR. The subtag memory 412 may include a plurality of sub memories 415/416/417/418 which may store the subtags of the plurality of cache ways (e.g., of the instruction cache 220) and may output the stored subtags in response to the selection signal generated by the decoder 411.

In another example embodiment of the present invention, the subtag memory may include any number of sub memories (e.g., sub memories 415/416/417/418). For example, the number of sub memories may scale with a number of the plurality of cache ways in the instruction cache 220.

In the example embodiment of FIG. 4, the sub memories 415/416/417/418 may output the subtags of the plurality of cache ways in response to the selection signal generated by the decoder 411.

In another example embodiment of the present invention, the instruction cache 220 may be a 4-way set associative cache. However, it is understood that any well-known cache structure may be employed in other example embodiments of the present invention.

In the example embodiment of FIG. 4, each of the subtags stored in the subtag memory 412 may be a portion of a tag of a corresponding cache way in the instruction cache 220. If a cache miss occurs in the instruction cache 220, the tags of the cache ways included in the instruction cache 220 may be updated, and the lower N bits may be extracted from each of the updated tags (e.g., where N is a natural number, e.g., 3, 4, 5, etc.) and may be stored as a subtag.

In the example embodiment of FIG. 4, as a number represented by bits of an updated tag stored as a subtag increases, a cache way prediction may improve (e.g., the cache way prediction may have a higher probability of accuracy).

An operation where tags may be replaced in an instruction cache when a cache miss occurs is well-known in the art and the description thereof will be omitted for the sake of brevity.

In the example embodiment of FIG. 4, the comparator 262 may include a plurality of comparators 421/423/425/427 and may compare the lower N bits of data in a tag field of the branch target address TADR (e.g., a subtag of the branch target address TADR) with a plurality of subtags received from the subtag buffer 261. The comparators 421/423/425/427 may generate a plurality of comparison signals at one of the first logic level (e.g., a higher logic level) and the second logic level (e.g., a lower logic level) based on whether the subtag of the branch target address TADR is identical to the subtags output from the subtag buffer 261. Similar to the sub memories 415/416/417/418, other example embodiments of the present invention may include any number of comparators. For example, a number of comparators may scale with a number of cache ways in the instruction cache 220.

In the example embodiment of FIG. 4, the determiner 263 may include a plurality of logics 431/433/435/437 and may compare a logic state of the determination signal TNT received from the branch prediction unit 250, the logic state of the signal TB received from the fetch unit 210 and/or logic states of comparison signals received from the comparators 421/423/425/427. The determiner 263 may generate a plurality of cache way enable signals. For example, as illustrated in FIG. 4, the determiner 263 may generate cache way enable signals ENWAY[1], ENWAY[2], ENWAY[3] and ENWAY[4]. Similar to the sub memories 415/416/417/418, other example embodiments of the present invention may include any number of logics (e.g., logics 431/433/435/437) and/or cache way enable signals (e.g., ENWAY [1], etc . . . ). For example, a number of logics and/or cache way enable signals may scale with a number of cache ways in the instruction cache 220.

In another example embodiment of the present invention, if the logic state of at least one of the determination signal TNT, the signal TB and/or the corresponding comparison signal received from at least one of the comparators 421/423/425/427 is at the second logic level (e.g. a lower logic level), the determiner 263 may generate the at least one of the corresponding cache way enable signals ENWAY[1], ENWAY[2], ENWAY[3] and ENWAY[4] at the second logic level. Otherwise, the determiner 263 may generate the at least one of the corresponding cache way enable signals ENWAY[1], ENWAY[2], ENWAY[3] and ENWAY[4] at the first logic level (e.g., a higher logic level) if the logic states of the determination signal TNT, the signal TB and/or the corresponding comparison signal received from at least one of the comparators 421/423/425/427 are all at the first logic level.

Figure 5:
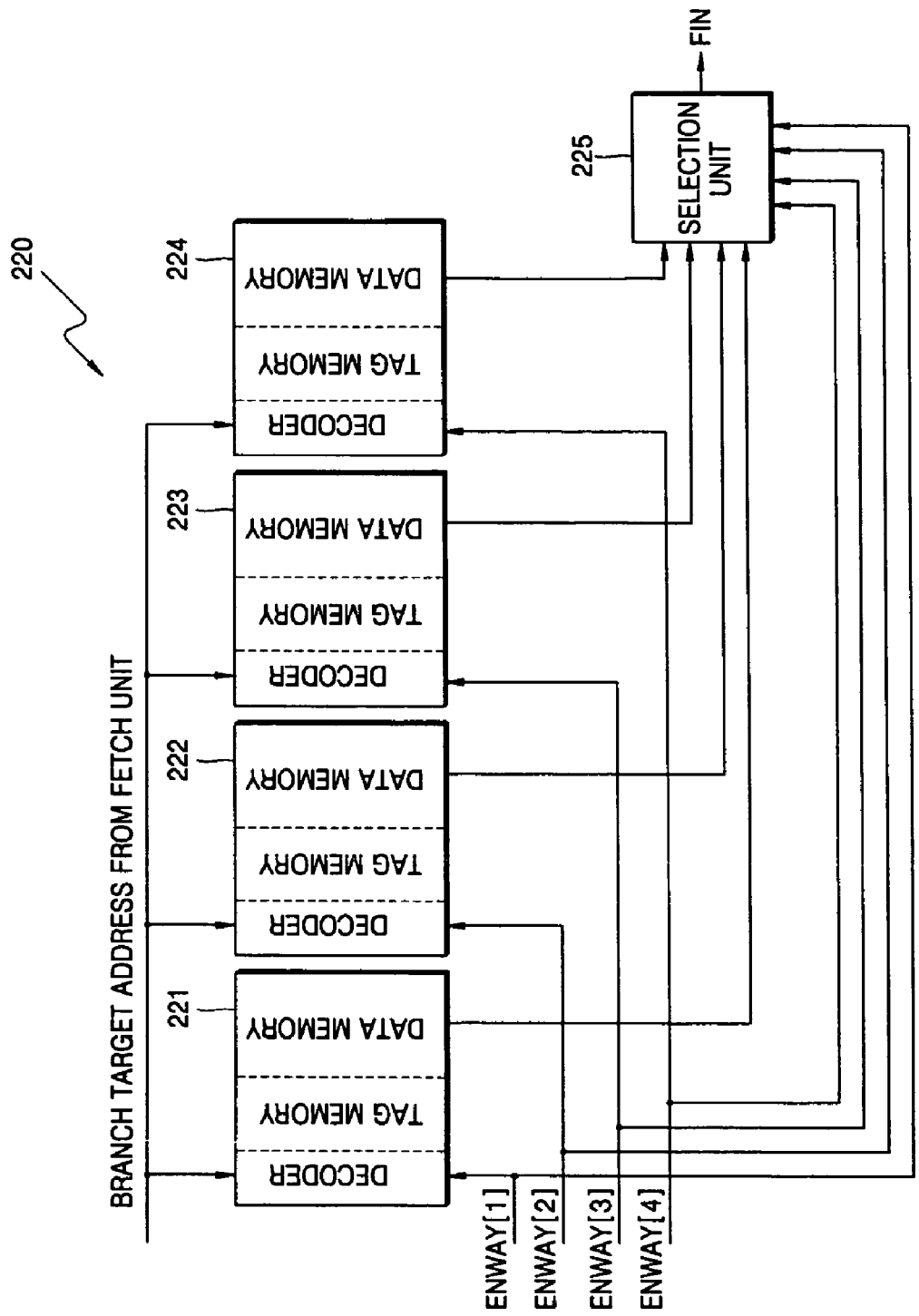
FIG. 5 illustrates an instruction cache of FIG. 2 according to another example embodiment of the present invention.

FIG. 5 illustrates the instruction cache 220 of FIG. 2 according to another example embodiment of the present invention. In the example embodiment of FIG. 5, the instruction cache 220 may include cache ways 221/222/223/224 and a selection unit 225 which may select cache hit data. Each of the cache ways 221/222/223/224 may include a decoder which may select a tag block referencing an index field of an address selected by the fetch unit 210, a tag memory which may be accessed when tag matching may be performed (e.g., by the cache way prediction unit 260) and a data memory which may correspond to an offset field of the selected address.

In the example embodiment of FIG. 5, if the fetch address FADR is determined to be a branch instruction which is predicted to branch (e.g., by the branch prediction unit 250) and the branch target address TADR selected by the fetch unit 210 is transmitted to the instruction cache 220, the instruction cache 220 may access the cache way determined by the cache way prediction unit 260 (e.g., the cache way with a higher predicted cache hit probability). Thus, the instruction cache 220 may not be required to access all of the plurality of cache ways in the instruction cache 220, thereby reducing power consumption and/or processing delays in the instruction cache 220.

For example, if the cache way enable signal ENWAY[1] is set to the first logic level (e.g., a higher logic level) and the cache way enable signals ENWAY[2], ENWAY[3] and ENWAY[4] are set to the second logic level (e.g., a lower logic level), the cache way 221 may be enabled and the cache ways 222/223/224 may not be enabled. The instruction cache 220 may extract data corresponding to the offset field of the branch target address TADR from a block which may be determined through tag matching, where a cache hit may have occurred. The instruction cache 220 may select the extracted data using the selection unit 225 and may output the selected data as the fetch instruction FIN.

In another example embodiment of the present invention, the branch prediction unit 250 may determine a given one of a plurality of subtags in the cache way prediction unit 260 which matches a branch target address TADR by comparing each of the plurality of subtags with the portion of the branch target address TADR. The processor 200 may determine a cache way with a higher probability of a cache hit based on the comparison results and may extract the fetch instruction FIN without requiring access to all of the plurality of cache ways. In an example, only the cache way with the highest probability of the cache hit may be accessed.

In another example embodiment of the present invention, a processor may determine to fetch an instruction for a next clock cycle at a given address. The processor predicts a cache way to be accessed to fetch the instructions from an instruction cache (e.g., a set associative instruction cache) by executing a cache way prediction operation. By predicting the cache way to access for the next clock cycle, less than all of the cache ways in the instruction cache may be accessed (e.g., only one cache way). Thus, the cache way prediction and cache way access according to an example embodiment of the present invention may reduce power consumption and/or increase an operation speed of the processor.

In another example embodiment of the present invention, a processor (e.g., processor 200) may predict at least one cache way to access for retrieving an instruction (e.g., a branch instruction) without accessing an instruction cache (e.g., where the at least one cache way may be located). For example, a cache way prediction unit (e.g., cache way prediction unit 260) may store subtags which correlate to cache ways in the instruction cache (e.g., instruction cache 220). Thus, the cache way prediction unit may execute a cache way prediction using subtags stored somewhere other than an instruction cache (e.g., branch prediction unit 260, etc.), and may not require access to the instruction cache.

In another example embodiment of the present invention, a processor (e.g., processor 200) may predict at least one cache way to access for retrieving an instruction (e.g., a branch instruction) by comparing less than all of a cache way tag with an address of an instruction (e.g., a branch instruction predicted to branch). For example, a cache way prediction unit (e.g., cache way prediction unit 260) may store subtags which correlate to cache ways in the instruction cache (e.g., instruction cache 220). The stored subtags may include less than all of entire corresponding tags associated with an instruction cache (e.g., instruction cache 220). In other example embodiments, the subtags may be stored in any part (e.g., instruction cache 220, etc.) of the processor 200. Thus, the cache way prediction unit may execute a cache way prediction using subtags which may include less than all of an entire tag of a corresponding cache way.

Although described primarily in terms of hardware above, example methodology implemented by one or more components of the example system described above may also be embodied in software as a computer program. For example, a program in accordance with example embodiments of the present invention may be a computer program product causing a computer to execute a method of cache way prediction, as described above.

The computer program product may include a computer-readable medium having computer program logic or code portions embodied thereon for enabling a processor of the system to perform one or more functions in accordance with the example methodology described above. The computer program logic may thus cause the processor to perform the example method, or one or more functions of the example method described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAM, ROM, flash memories and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

These programs may also be provided in the form of an externally supplied propagated signal and/or a computer data signal embodied in a carrier wave. The computer data signal embodying one or more instructions or functions of the example methodology may be carried on a carrier wave for transmission and/or reception by an entity that executes the instructions or functions of the example methodology. For example, the functions or instructions of the example method may be implemented by processing one or more code segments of the carrier wave in a computer controlling one or more of the components of the example system of FIGS. 2, 3, 4 and/or 5, where instructions or functions may be executed for cache way prediction, in accordance with any of the above-described example methods.

Further, such programs, when recorded on computer-readable storage media, may be readily stored and distributed. The storage medium, as it is read by a computer, may enable the processing of multimedia data signals prevention of copying these signals, allocation of multimedia data signals within an apparatus configured to process the signals, and/or the reduction of communication overhead in an apparatus configured to process multiple multimedia data signals, in accordance with the example method described herein.

Example embodiments of the present invention being thus described, it will be obvious that the same may be varied in many ways. For example, while example embodiments of the present invention have been described above with respect to a 4-set associative cache, it is understood that the instruction cache 220 according to other example embodiments of the present invention may be any well-known type of cache structure. Further, while above-described example embodiments predict a single cache way to access instead of accessing all cache ways in the instruction cache, other example embodiments may predict any number of cache ways. For example, if an instruction cache includes four cache ways, a branch prediction unit may predict one, two, three or four cache ways to access. Further, while unlikely, it is understood that in other example embodiments of the present invention every cache way in the instruction cache 220 may be accessed. For example, if each subtag in the cache way prediction unit 260 is identical, it may be possible that each ENWAY signal will enable its respective cache way in the instruction cache 220.

Further, it is understood that the above-described first and second logic levels/states may correspond to a higher level (e.g., a logic "1") and a lower logic level (e.g., a logic "0"), respectively, in an example embodiment of the present invention. Alternatively, the first and second logic levels/states may correspond to the lower logic level and the higher logic level, respectively, in other example embodiments of the present invention.

Such variations are not to be regarded as departure from the spirit and scope of example embodiments of the present invention, and all such modifications as would be obvious to one skilled in the art are intended to be included within the scope of the following claims.

What is claimed is:

1. A processor, comprising:
a cache way prediction unit for predicting at least one cache way for selection from among a plurality of cache ways without accessing an instruction cache, the cache way prediction unit including,
a determiner for ANDing a logic state of a determination signal (TNT) indicating whether a branch instruction is predicted to branch, a branch signal (TB) indicating whether a next fetch address to be fetched in a subsequent processor cycle is a branch target address (TADR) and a subtag signal, with the determiner generating at least one cache way enable signal (ENWAY);
a branch prediction unit for providing the branch target address (TADR), where the branch target address (TADR) provided by the branch prediction unit is used for determining the next fetch address and predicting the at least one cache way in the cache way prediction unit; and
a fetch unit for outputting a current fetch address (FADR) for each current clock cycle in response to a program counter signal, where the fetch unit receives the branch target address (TADR) from the branch prediction unit.

2. The processor of claim 1, wherein,
the fetch unit selects and outputs one of the branch target address and an incremented address as the next fetch address in the subsequent clock cycles, and
the branch prediction unit determines whether the next fetch address corresponds to the branch instruction and outputs the determination signal.

3. The processor of claim 1, wherein the at least one cache way has a higher predicted probability for a cache hit than the at least one other of the plurality of cache ways.

4. The processor of claim 1, wherein the cache way prediction unit is used to access data that is an instruction for a subsequent clock cycle.

5. The processor of claim 1, further comprising:
an instruction decoder for decoding a fetch instruction and interpreting a type of operation designated by the fetch instruction; and
an execution unit for executing the decoded fetch instruction.

6. The processor of claim I, wherein the cache way prediction unit includes:
a subtag buffer for outputting at least one subtag of the plurality of cache ways in response to the branch target address;
a comparator for comparing a portion of the branch target address with the at least one subtag received from the subtag buffer and outputting the subtag signal; and
wherein the at least one cache way enable signal is generated at a first logic level if the determination indicates the compared logic states are all at a first state and a second logic level if the determination indicates the compared logic states are not all at the first state.

7. The processor of claim 6, wherein the subtag buffer includes:
a decoder for generating a selection signal referencing an index field of the branch target address; and
a subtag memory with a plurality of sub-memories, the subtag memory storing the subtags of the plurality of cache ways in the sub-memories and outputting at least one of the stored subtags in response to the selection signal.

8. The processor of claim 7, wherein a number of the sub-memories included in the subtag memory scales with a number of the plurality of cache ways.

9. The processor of claim 1, wherein the subtag is a portion of a corresponding tag.

10. The processor of claim 9, wherein the portion of the corresponding tag includes N bits and the subtag includes less than N bits, wherein N is a natural number.

11. The processor of claim 9, wherein at least one subtag is updated when the instruction cache updates a corresponding at least one tag.

12. The processor of claim 11, wherein the updating is in response to a cache miss.

13. The processor of claim 2, wherein the branch prediction unit includes:
a branch target buffer which outputs the branch target address and a branch address tag in response to the fetch address;
a tag comparator which compares the branch address tag with a tag included in the fetch address and generates a comparison signal based on the comparison results;
a prediction logic which generates a prediction signal indicating whether the fetch address corresponds to a branch instruction for which a branch is predicted; and
a determiner which generates the determination signal based on the comparison signal and the prediction signal.

14. The processor of claim 13, wherein the branch target buffer comprises:
a decoder which generates a selection signal referencing an index field of the fetch address; and
a memory which stores a plurality of branch address tags and a plurality of branch target addresses and outputs one of the branch address tags and one of the branch target addresses in response to the selection signal.

15. A method of processing, comprising:
predicting at least one cache way for selection from among a plurality of cache ways without accessing an instruction cache, the predicting including,
determining the at least one cache way for selection by ANDing a logic state of a subtag signal, a determination signal (TNT) indicating whether a current fetch address (FADR) corresponds to a branch instruction for which a branch is predicted, and a branch signal (TB) indicating whether a next fetch address to be fetched in a subsequent processor cycle is a branch target address (TADR);

providing the branch target address (TADR), where the branch target address (TADR) provided is used for determining the next fetch address and predicting the at least one cache way; and fetching the current fetch address (FADR) for each current clock cycle in response to a program counter signal, where the fetching receives the branch target address (TADR) from the providing.

16. The method of claim 15, further comprising:
outputting cache hit data as a fetch instruction based on the next fetch address, wherein
the predicting further includes,
    comparing a portion of the branch target address with subtags of the plurality of cache ways and outputting the subtag signal;
the fetching further includes,
    selecting and outputting one of the branch target address and an incremented address as the next fetch address for the subsequent clock cycle based on whether the fetch address corresponds to a branch instruction; and
the providing further includes,
    determining whether the next fetch address corresponds to the branch instruction; and
    outputting the determination signal.

17. The method of claim 15, wherein the predicting further includes accessing data that is a fetch instruction.

18. The method of claim 17, further comprising:
decoding the fetch instruction;
determining a type of operation for the decoded fetch instruction; and
executing the decoded fetch instruction based on the determined type of operation.

19. The method of claim 15, wherein the determining further includes:
outputting subtags of the plurality of cache ways in response to the branch target address; and
generating at least one cache way enable signal based on the comparison,
wherein the at least one cache way enable signal is generated at a first logic level if the determination indicates the compared logic states are all at a first state and a second logic level if the determination indicates the compared logic states are not all in the first state.

20. The method of claim 19, wherein the outputting of the subtags includes generating a selection signal referencing an index field of the branch target address and outputting the subtags of the plurality of cache ways in response to the selection signal.

21. The method of claim 19, wherein a number of the sub-memories scales with a number of the plurality of cache ways.

22. The method of claim 15, wherein the subtag is a portion of a corresponding tag.

23. The method of claim 22, wherein the portion of the corresponding tag includes N bits and the subtag includes less than N bits, wherein N is a natural number.

24. The method of claim 22, wherein at least one subtag is updated when a corresponding at least one tag is updated.

25. The method of claim 17, further comprising:
determining whether the fetch instruction is a branch instruction.

26. The method of claim 25, wherein the determining whether the fetch instruction is a branch instruction includes:
outputting the branch target address and a branch address tag in response to the fetch address of the fetch instruction;
comparing the branch address tag with a tag included in the fetch address;
generating a comparison signal based on the comparison;
generating a prediction signal indicating whether the fetch address corresponds to a branch instruction for which a branch is predicted; and
generating the determination signal based on the comparison signal and the prediction signal.

27. The method of claim 26, wherein the outputting includes generating a selection signal referencing an index field of the fetch address and outputting the branch address tag and the branch target address from a memory in response to the selection signal, the memory including a plurality of branch address tags and a plurality of branch target addresses.

28. A method of processing, comprising:
predicting at least one cache way from among a plurality of cache ways to access in an instruction cache, the predicting including,
    comparing an address of a predicted instruction (TADR) and less than all of a cache way tag, and
    determining the at least one cache way to access based on the comparison, a determination signal (TNT) indicating whether a current fetch address (FADR) corresponds to a branch instruction for which a branch is predicted, and a branch signal (TB) indicating whether a next fetch address to be fetched in a subsequent processor cycle is the predicted instruction (TADR);
providing the predicted instruction (TADR), where the predicted instruction (TADR) provided is used for determining the next fetch address and predicting the at least one cache way; and
fetching the current fetch address (FADR) for each current clock cycle in response to a program counter signal, where the fetching receives the branch target address (TADR) from the providing.

29. The method of claim 28, wherein the less than all of the cache way tag is a subtag.

30. The method of claim 29, wherein the subtag is not stored at the instruction cache.

31. The method of claim 28, wherein the predicted instruction is a branch instruction expected to branch.

32. A processor for performing the method of claim 15.

33. A processor for performing the method of claim 28.

34. The processor of claim 1, wherein the cache way prediction unit predicts the at least one cache way at a same time as the branch prediction unit determines whether the address to be fetched corresponds to the branch instruction.

35. The processor of claim 1, wherein the branch signal (TB) is generated at a first logic level if the address to be fetched is the branch target address (TADR) and generated at a second logic level if the address to be fetched is not the branch target address (TADR).

36. The processor of claim 1, wherein all of the plurality of cache ways are accessed when at least one of the determination signal (TNT) and the branch signal (TB) is de-activated, and only the at least one predicted cache way is accessed in response to the at least one cache way enable signal (ENWAY) being activated when both the determination signal (TNT) and the branch signal (TB) are activated.

37. The method of claim 15, wherein all of the plurality of cache ways are accessed when at least one of the determination signal (TNT) and the branch signal (TB) is de-activated, and only the at least one predicted cache way is accessed in response to at least one cache way enable signal (ENWAY) being activated when both the determination signal (TNT) and the branch signal (TB) are activated.

38. The method of claim 28, wherein all of the plurality of cache ways are accessed when at least one of the determination signal (TNT) and the branch signal (TB) is de-activated, and only the at least one predicted cache way is accessed in response to at least one cache way enable signal (ENWAY) being activated when both the determination signal (TNT) and the branch signal (TB) are activated.

39. The processor of claim 1, wherein,
the cache way prediction unit is selectively enabled in response to the branch signal (TB), and
the cache way prediction unit predicts the at least one cache way at a same time as the fetch unit determines the next fetch address.

40. The method of claim 15, wherein,
the predicting is selectively enabled in response to the branch signal (TB), and
the predicting predicts the at least one cache way at a same time as the fetching determines the next fetch address.

41. The method of claim 28, wherein,
the predicting is selectively enabled in response to the branch signal (TB), and
the predicting predicts the at least one cache way at a same time as the fetching determines the next fetch address.

* * * * *